US007804038B2

(12) United States Patent
Bortolus et al.

(10) Patent No.: US 7,804,038 B2
(45) Date of Patent: Sep. 28, 2010

(54) MULTI-VACUUM CONTACTOR CONTROL SYSTEM

(75) Inventors: Angelo Bortolus, Mississauga (CA); Reginald A. Drake, Bright (CA); F. Michael Frayne, Waterloo (CA); David S. MacLennan, Ayr (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 460 days.

(21) Appl. No.: 11/863,668

(22) Filed: Sep. 28, 2007

(65) Prior Publication Data

US 2009/0084761 A1    Apr. 2, 2009

(51) Int. Cl.
*H01H 33/66* (2006.01)
*H01H 9/38* (2006.01)
*G05B 15/00* (2006.01)
*H01H 1/66* (2006.01)
*H01H 51/00* (2006.01)

(52) U.S. Cl. .......................... 218/140; 218/10; 218/28; 218/118; 218/141; 700/1; 700/12; 700/13; 315/73; 315/153; 335/151; 361/143; 361/146

(58) Field of Classification Search .................. 700/1–3, 700/12–14, 19–20, 66; 218/2, 10, 28, 118, 218/120, 124, 140–141; 315/73, 151, 153; 335/151; 361/139, 143, 146, 160
See application file for complete search history.

(56) References Cited

U.S. PATENT DOCUMENTS

| | | | | |
|---|---|---|---|---|
| 3,708,638 A | * | 1/1973 | Mitchell | 218/118 |
| 5,422,553 A | * | 6/1995 | MacLennan et al. | 318/565 |
| 5,506,485 A | * | 4/1996 | Mueller et al. | 318/600 |
| 5,610,579 A | * | 3/1997 | Early et al. | 340/517 |
| 5,652,420 A | | 7/1997 | Innes et al. | |
| 6,156,989 A | * | 12/2000 | Miller et al. | 218/120 |
| 6,252,365 B1 | * | 6/2001 | Morris et al. | 318/455 |
| 6,445,969 B1 | * | 9/2002 | Kenney et al. | 700/108 |
| 7,398,127 B2 | * | 7/2008 | Boger et al. | 700/9 |
| 7,593,211 B2 | * | 9/2009 | Maclennan et al. | 361/160 |
| 2006/0126257 A1 | * | 6/2006 | Domo et al. | 361/139 |
| 2006/0127183 A1 | * | 6/2006 | Bishop, Jr. | 405/37 |
| 2006/0148481 A1 | * | 7/2006 | Boger et al. | 455/445 |
| 2007/0235668 A1 | * | 10/2007 | Goldman et al. | 251/30.05 |

\* cited by examiner

*Primary Examiner*—Ramesh B Patel
(74) *Attorney, Agent, or Firm*—Boyle Fredrickson LLP; Alexander R. Kuszewski; John M. Miller

(57) ABSTRACT

A control system for controlling and synchronizing a plurality of medium-voltage vacuum contactors comprises a two-level network structure. A dedicated network includes a plurality of servant control units operably coupled to the vacuum contactors and configured to ascertain a plurality of different data and conditions thereof. In addition, the dedicated network includes a master control unit in serial communication with the servant control units and configured to send and receive communications therewith. The master control unit is operably coupled to a control network including a plurality of various control devices. The master control unit is configured to send predetermined data received from the servant control units to the control network. The two-level network structure enables relatively jitter free communication on the dedicated network while not overwhelming the control network with unnecessary data. The system is further configured to diagnose and prevent a variety of different vacuum contactor failures.

15 Claims, 5 Drawing Sheets

| BYTE # | 7 MSB | 72 IB ADDRESS | 5 | LSB | 4 MSB | 73 UNSCHEDULED RESPONSE NO. FROM IB TO IE | 0 LSB | 71 |
|---|---|---|---|---|---|---|---|---|
| 0 | | | | | | | | |
| 1 | colspan="7" | INPUT LINE VOLTAGE (SR) HIGH BYTE | | | | | | 74 |
| 2 | colspan="7" | INPUT LINE VOLTAGE (SR) LOW BYTE | | | | | | 75 |
| 3 | colspan="7" | MAIN DC BUS VOLTAGE (SR) HIGH BYTE | | | | | | 76 |
| 4 | colspan="7" | MAIN DC BUS VOLTAGE (SR) LOW BYTE | | | | | | 77 |
| 5 | colspan="7" | VACUUM CONTACTOR COIL CURRENT (SR) HIGHBYTE | | | | | | 78 |
| 6 | colspan="7" | VACUUM CONTACTOR COIL CURRENT (SR) LOW BYTE | | | | | | 79 |
| 7 | colspan="7" | USER INPUT COMMANDS (SR) | | | | | | 80 |
| 8 | colspan="7" | DIP SWITCH INPUTS (UR) MSW-HIGH BYTE | | | | | | 81 |
| 9 | colspan="7" | DIP SWITCH INPUTS (UR) MSW-LOW BYTE | | | | | | 82 |
| 10 | colspan="7" | DIP SWITCH INPUTS (UR) LSW-HIGH BYTE | | | | | | 83 |
| 11 | colspan="7" | DIP SWITCH INPUTS (UR) LSW-LOW BYTE | | | | | | 84 |
| 12 | colspan="7" | FAULTS / WARNINGS (UR) HIGH BYTE | | | | | | 85 |
| 13 | colspan="7" | FAULTS / WARNINGS (UR) LOW BYTE | | | | | | 86 |
| 14 | colspan="7" | CRC HIGH BYTE | | | | | | 87 |
| 15 | colspan="7" | CRC LOW BYTE | | | | | | 88 |

FIG. 3b

MULTI-VACUUM CONTACTOR CONTROL SYSTEM

STATEMENT REGARDING FEDERALLY SPONSORED RESEARCH OR DEVELOPMENT

N/A

CROSS REFERENCE TO RELATED APPLICATION

N/A

BACKGROUND OF THE INVENTION

The present invention relates generally to medium-voltage vacuum contactors and in particular to control systems for controlling and synchronizing multiple vacuum contactors.

A vacuum contactor generally comprises three interrupters or vacuum bottles operated by an electromagnet assembly through a mechanical linkage. Such vacuum contactors are resistant to a variety of adverse atmospheric conditions and have relatively long electrical and mechanical lives. Each interrupter consists of two contacts enclosed in a ceramic housing or metal bellows. An upper contact is mounted to a fixed shaft and the lower contact is mounted to a moveable shaft. Each contactor is in communication with a control module adapted to open and close the contacts of the contactors. Medium voltage vacuum contactors are designed to operate in the 2400-7200 volt range and may be used with all types of Alternating Current (AC), loads including, for example, three-phase motors, transformers, power capacitors and resistive heating loads.

Vacuum contactors oftentimes include microprocessor "controllers" in communication therewith and configured to allow the contactors to be controlled, for example, from remote locations by digital signals sent along a control network. Typically, these control networks are low-level control networks such as, for example, DEVICENET, having a limited number of nodes being based on the Controller Area Network (CAN) standard. For this reason, communication between a control system and the vacuum contactor controllers is normally limited to simple on and off commands. The timing sequence may be controlled by a Programmable Logic Controller (PLC).

Control systems for electrical switching devices such as contactors are generally known in the art. For example, systems such as those disclosed in U.S. Pat. Nos. 5,506,485 to Mueller et al. and 5,610,579 to Early et al. disclose control systems for electrical switching devices. Typically, the control networks communicating between the PLC are low-level control networks such as DEVICENET providing simple interface circuitry but being able to connect only a limited number of nodes being based on the CAN standard (originally intended for automotive use). DEVICENET communication between a control system and the vacuum contactor controllers is suitable for simple on and off commands. However, the aforementioned systems are adapted for use with relatively low-voltage switching devices. Accordingly, a system for operating relatively higher voltage switching devices is desired.

In the control of medium voltage motors and the like it may be desirable to provide for high-speed synchronization of multiple vacuum contactors or other operations that require high speed communication. Such high speed communication could be possible through higher speed control networks such as CONTROLNET or ETHERNETIP, but these networks require considerable interface circuitry and sophisticated interconnecting media that would be prohibitively expensive on individual vacuum contactor controllers.

SUMMARY OF THE INVENTION

The present inventors have recognized that more sophisticated monitoring of the vacuum contactor controllers may be performed by generating a two-level network having a local dedicated network allowing high-speed communication of real-time operating data from the vacuum contactor controllers to a master module which may then use this data directly for coordination of the vacuum controllers or to abstract important information for forwarding to a PLC or the like on a low-speed network. The present invention allows valuable real-time information about contactor operation to be collected while still allowing the contactors to be controlled with a simple low-speed control network. The real-time data offers the possibility of a variety of improved functions. For example, such data allows for the prediction of contact failure, anti-kiss and anti-pumping protection features.

Specifically, the present invention provides a vacuum contactor system for use in an industrial control system having a plurality of vacuum contactors. The system further comprises a plurality of servant control units associated with each one of the vacuum contactors. Each of the servant control units includes a processor, memory module, and at least one sensor adapted to monitor operation of the associated vacuum contactor to provide real-time operating data of the vacuum contactor. The system further comprises a dedicated network connecting the plurality of servant control units for communication therebetween. The dedicated network, however, is not connected with the other devices in the industrial control system. The system also comprises a control network configured to communicate with the other devices in the industrial control system. Further, a master control unit having a processor and memory module is provided to communicate with the dedicated network and control network thereby exchanging data therebetween. The servant control units and master unit are configured to execute a stored program so that the servant control units may communicate the real-time operating data to the master control for coordination of all of the vacuum contactors by the master control unit.

It is thus one object of the present invention to permit high speed exchange of real-time operating data for coordination of vacuum contactors without overwhelming low bandwidth low-level control networks.

The master control unit of the present invention may be configured to control the vacuum contactors.

It is thus another object of the present invention to allow cost-effective local control of all of the vacuum contactors by using one vacuum contactor controller as the master controller thereby eliminating the need for a dedicated master controller. It is a further object of the invention to allow communication with the control system for a single vacuum contactor by using a master control module.

The master control unit may further be adapted to communicate real-time data with an industrial control system.

It is thus another object of the present invention to provide the benefits of selected real-time data to the control system without overwhelming the low-level control network.

The master control unit may further provide anti-kiss functionality that ensures that the contacts of the vacuum contactors are closed and sealed prior to being opened.

It is thus another object of the present invention to provide improved protection of the vacuum contactors that maybe coordinated from a master location.

The master control unit may further provide anti-pumping protection functionality wherein the master control unit prevents the contacts of the vacuum contactors from rapidly opening and closing.

It is thus another object of the present invention to provide improved protection for the contacts of the vacuum contactors by coordinating their operation from a master location.

The master control unit of the present invention may further provide a failure prediction of the individual contacts of each of the vacuum contactors.

It is thus yet another object of the invention to allow predictive monitoring of failures of vacuum contactors that may be communicated to the control system.

The communication protocol of the present invention may be configured to provide a fixed time slot for each vacuum contactor.

It is thus another object of the present invention to provide a predictable communication protocol to prevent loss of network data.

The communication protocol of the present invention may further transmit scheduled and unscheduled communications from the master control unit to the servant control units and from the servant control units to the master control unit.

It is thus yet another object of the present invention to provide a communication protocol capable of communicating both primary data on a continuous basis as well as secondary data on an as-needed basis while managing network traffic.

The control system of the present invention may further be configured to communicate a variety of different data including line voltages, coil current, Cyclic Redundancy Check (CRC), and warning messages.

It is yet another object of the present invention to provide continuous monitoring of vacuum contactor data.

The dedicated network of the present invention is configured to provide direct communications to the slave modules thereby bypassing the latency that would be inherent in using the control network.

It is thus an object of the present invention to allow for relatively fast communication between the devices of the dedicated network while not overwhelming the bandwidth of the control network.

These particular features and advantages may apply to only some embodiments falling within the claims and thus do not define the scope of the invention.

BRIEF DESCRIPTION OF THE DRAWINGS

FIG. 3B is a diagram of the message structure of a communication from the servant control unit of the present invention to a master control unit of the present invention;

DETAILED DESCRIPTION OF THE PREFERRED EMBODIMENT

Figure 1:
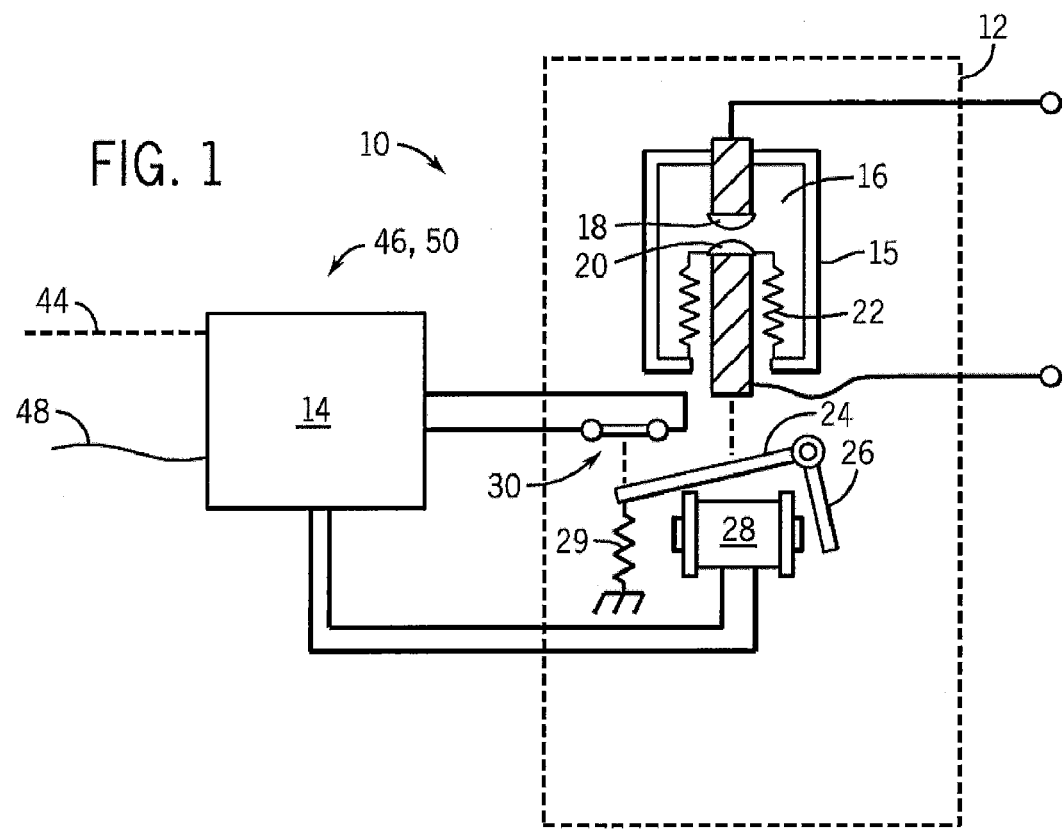
FIG. 1 is a cross-sectional view of a vacuum contactor used with the present invention.

Referring initially to FIG. 1, a vacuum contactor system 10 includes a vacuum contactor 12 and a vacuum contactor controller 14. As is generally understood in the art, the vacuum contactor 12 may include one or more vacuum bottles 15 providing a sealed evacuated chamber 16. Within the chamber 16 are two contacts: a stationary contact 18 fixed with respect to the vacuum bottle 15, and a movable contact 20 attached to the vacuum bottle 15 by means of a bellows 22. The bellows 22 allows axial motion of the movable contact 20 toward and away from the stationary contact 18 under the influence of a pivoting armature 24 attached to the movable contact 20 through a biasing spring (not shown).

The armature 24 is raised or lowered by attraction between an armature tab 26 and a pole of a first electromagnet 28. In operation, the armature 24 is moved to a lowered position, separating the contacts 18 and 20, under the urging of a biasing spring 29 and is moved to a raised position by the attraction of the tab 26 to the electromagnet 28 when the electromagnet is energized. Raising the armature 24 also opens a normally closed auxiliary contact 30 outside the vacuum bottle 15.

Figure 2:
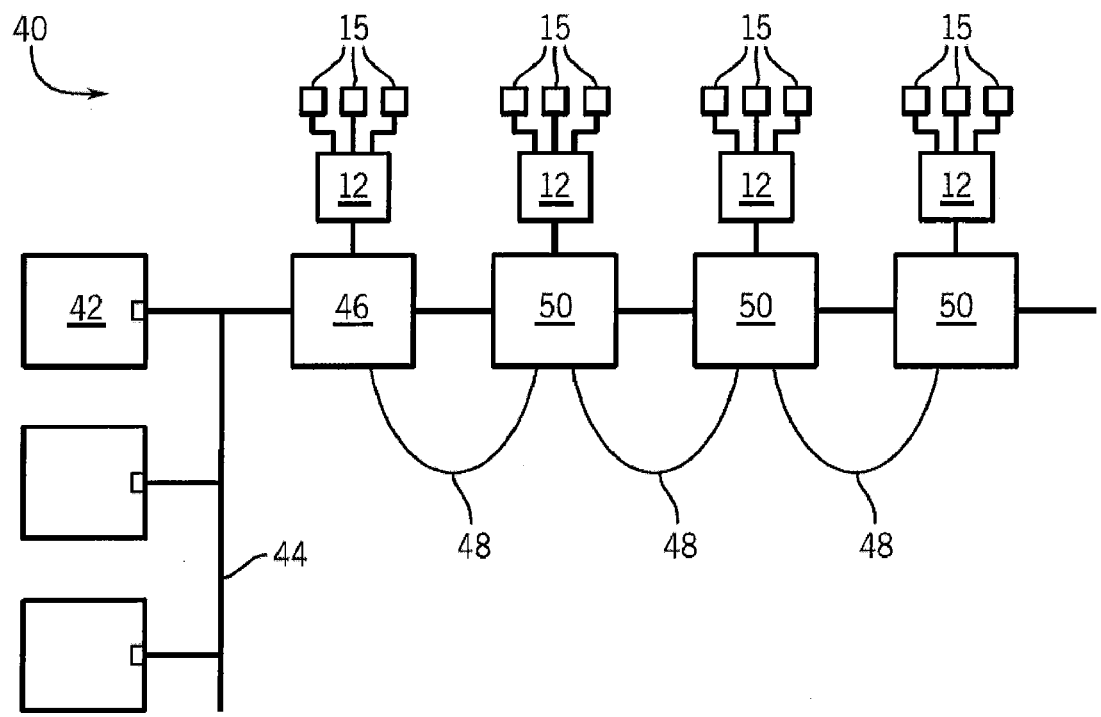
FIG. 2 is a schematic diagram of the dedicated network of the control system of the present invention communicating between a master and multiple servant control units.

Turning now to FIG. 2, the industrial control system 40 of the present invention includes a PLC 42 in communication with a control network 44 and a master control unit 46. The control network 44 typically includes a plurality of other devices attached thereto. The master control unit 46 is in communication with a dedicated network 48 and includes a processor and a memory module for communicating therewith.

Control network 44 is typically used to interconnect various control devices for data exchange. Further, control network 44 is generally a relatively simple and slow network and typically comprises a baudrate in the range of 125 kbits/s and 500 kbits/s. Control network 44 is preferably DEVICENET.

The dedicated network 48 comprises a plurality of servant control units 50 connected to one another for communication therebetween. The information communicated between master control unit 46 and the servant control units 50 may be both predetermined and user defined. In addition, the dedicated network 48 is not in communication with the other devices of the industrial control system 40.

Further, dedicated network 48 typically comprises a plurality of Recommended Standard 485 (RS-485) serial connections. Communication across the RS-485 serial connections allows for relatively fast communication on the dedicated network. By separating the dedicated network 48 from the control network 44, a large amount of relatively fast communications may take place on a dedicated network 48 without overwhelming the relatively slow control network 44. The use of a RS-485 interface rather than a Recommended Standard 232 (RS-232) interface allows the master control unit 46 to communicate with up to six servant control units 50 whereas the use of a RS-232 interface would limit the master control unit 46 to communication with two servant control units 50.

The communications carried out over the RS-485 serial interface between the master 46 and the individual servant control units 50 will be carried out at a periodic, predetermined rate such as, for example, every 10 ms. Servant control units 50 are configured to send a variety of different real-time data to the master 46 such as, for example, input line voltage, main DC bus voltage, vacuum contactor coil current feedback, user inputted commands, Dual in-line Package (DIP) switch settings, fault/status/warning messages, and any other such data as may be deemed necessary in the practice of the control system 40 of the present invention. Likewise, the master 46 also sends a variety of data over the RS-485 serial interface to the servant control units 50 such as various control commands, coil current control, drop-out time, time delay under-voltage ride through (TDUV) time, jump to bootcode commands, learn mode commands, and other such commands as may be deemed necessary.

Each of the servant control units 50 is coupled to a vacuum contactor 12 for communication therewith. Servant control units 50 include a processor, memory module, and at least one sensor adapted to monitor operation of the associated vacuum contactor 12 to receive real-time operating data of the vacuum contactor. Further, servant control units 50 are configured to execute a stored program that is configured to communicate the real-time operating data to the master control unit 46 for coordination of all of the vacuum contactors 12 by the master control unit 46. In addition, the communication between the servant control units 50 and the master control unit 46 is synchronized so as to ensure that the contactors 12 of the present invention work in unison.

The master control unit 46 may be configured to communicate certain real-time data received from servant control units 50 to the industrial control system 40 of the present invention. Accordingly, by providing a dedicated network 48 for the exchange of real-time data between servant control units 50 to monitor the vacuum contactors 12, the system of the present invention is capable of communicating necessary information to the control system 40 through the master control unit 46 without overburdening the control system 40 with all of the real-time data exchanged between servant control units 50 and master control unit 46. As such, only that real-time information required by the control system 40 is communicated from the master control unit 46 through PLC 42 to the control system 40.

The communication between the servant control units 50 and the master control unit 46 allows for the monitoring of the vacuum contactors 12 associated with servant control units 50. For example, the mechanical and electrical condition of the vacuum contactors 12 may be communicated from each of the servant control units 50 to the master unit 46. Accordingly, the master unit 46 may communicate that information by way of, for example, a Personal Digital Assistant (PDA) interface or other such communication device to a user thereby allowing for the performance of preventive maintenance of the vacuum contactors 12.

Figure 3A:
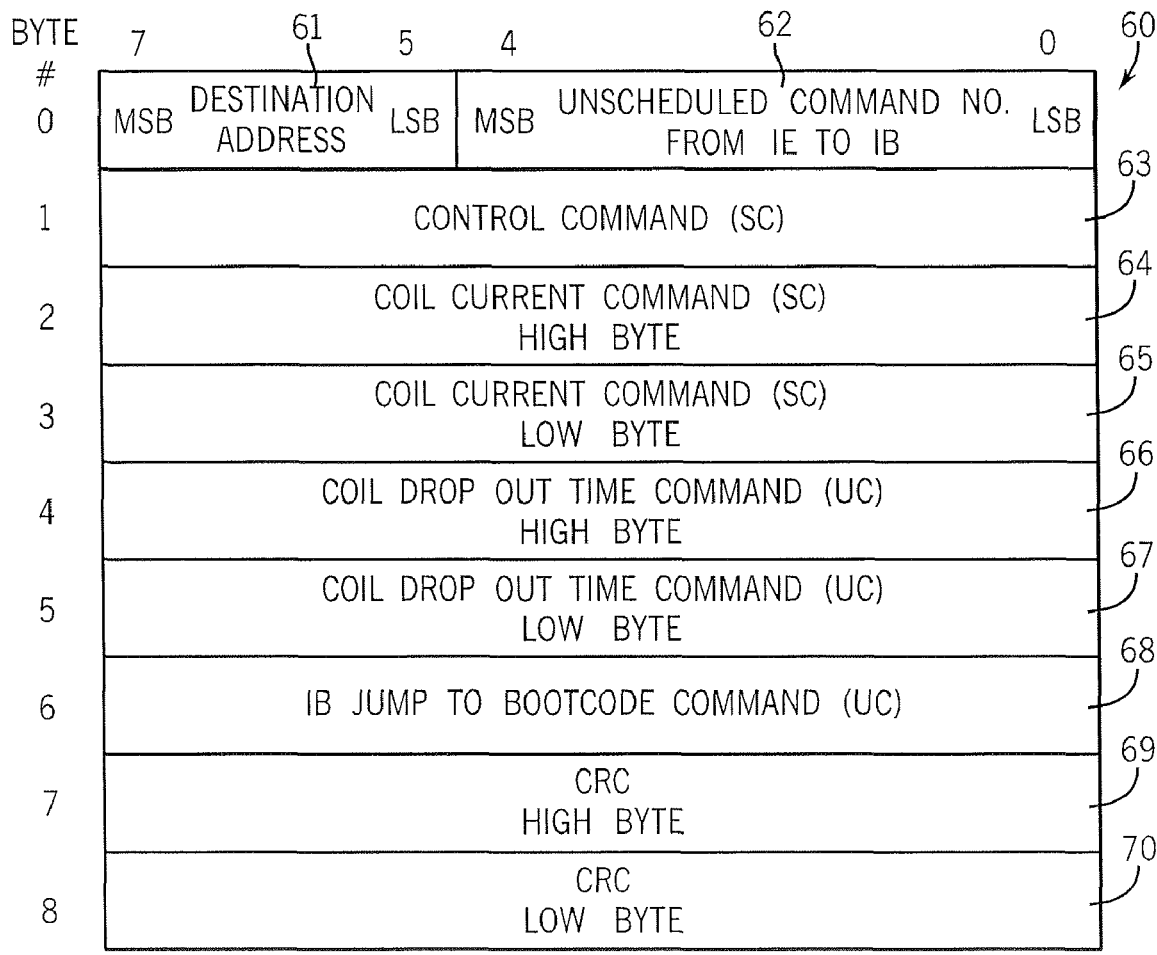
FIG. 3A is a diagram of the message structure of a communication from the master control unit of the present invention to a servant control unit of the present invention.

Turning now to FIGS. 3A and 3B, a diagram depicting the data packet message structure for the dedicated network 48 of the present invention is shown. First turning to FIG. 3A, a data structure 60 depicting communications from the master control unit 46 to the servant control units 50 is illustrated. Data structure 60 includes a destination address 61, an Unscheduled Command 62, Control Command 63, Coil Current Command High Byte 64, Coil Current Command Low Byte 65, Coil Drop Out Time Command High Byte 66, Coil Drop Out Time Command Low Byte 67, and Servant Control Unit Jump to Bootcode Command 68, CRC High Byte 69, and CRC Low Byte 70.

Unscheduled command 62 and unscheduled response 73 comprise the sending and receiving by the master control unit 46 and servant control units 50 of secondary operations data. Unscheduled commands and responses are typically only sent on the first transmission cycle as most of the data transmitted between the master control unit 46 and servant control units 50 are required on a continuous basis.

Control command 63 comprises a command input for opening and closing the contactors of the various vacuum contactors 12 of the control system 40. Further, control commands 63 serve as status relays for indicating contactor and control unit status.

Coil Current commands 64, 65 represent the levels of the contactor coil currents of the contactors 12 of the present system 40. Coil drop out time 66, 67 represents the time in millisecond increments between when an open command is given and the time when the contactor should drop out.

Servant jump to bootcode 68 is a command sent to prompt the servant control unit 50 to which the message is directed to jump to its bootcode thereby allowing for reprogramming of that particular servant 50. Preferably, the system 40 of the present invention will only allow for the command to be issued if a particular servant is currently not powering its own contactor coil. If the servant 50 is actually powering the contactor coils when the message is received, the servant 50 simply ignores the message.

CRC 69, 70 represents a message containing, for example, a checksum value from which the integrity of data may be determined by checking against this received value and a real time calculated value.

Referring now specifically to FIG. 3B, data structure 71 illustrates the servant control unit 50 to master control unit 46 message data structure. Data structure 71 includes the Address of the servant control unit 72, Unscheduled Response 73, Input Line Voltage High Byte 74, Input Line Voltage Low Byte 75, Main Direct Current (DC) Bus Voltage High Byte 76, Main DC Bus Voltage Low Byte 77, Vacuum Contactor Coil Current High Byte 78, Vacuum Contactor Coil Current Low Byte 79, User Input Command 80, DIP Switch Inputs 81-84, Faults/Warnings High Byte 85, Faults/Warnings Low Byte 86, CRC High Byte 87, and CRC Low Byte 88.

Input line voltage 74, 75 represents the root mean square ("RMS") value for the input line voltage. Main DC Bus Voltage 76, 77 represents the level of the DC bus voltage. Vacuum contactor coil current 78, 79 represents the real-time level of the contactor coil currents.

User input 80 contains bits that represent the status of the OPEN, CLOSE, and AUX inputs as well as the status of the MODULE/CONTACTOR status relays for the servant control units 50.

DIP Switch settings 81, 82, 83, and 84 contain information regarding the positions of various DIP switches on the network.

Faults and warnings 85, 86 represent various messages that may be communicated from the servants 50 to the masters 46. For example, invalid command, mechanical latch failures, contactor pick-up failures, contactor drop-outs, long drop-out times, and other such warnings may be communicated to the masters 46. Finally, CRC 87, 88 represent a message containing, for example, a checksum value from which the integrity of data may be determined by checking this value against a real time calculated value.

An important function of the message structure utilized by the present invention is that the length of each of the messages remains constant and thus it is perfectly predictable as to how often messages will occur, thereby ensuring that uncertainty in message delay or jitter is nearly nonexistent. This is especially important because if there is a lot of network jitter, operation of the system will be highly sporadic and therefore making operation thereof substantially unreliable.

Figure 4:
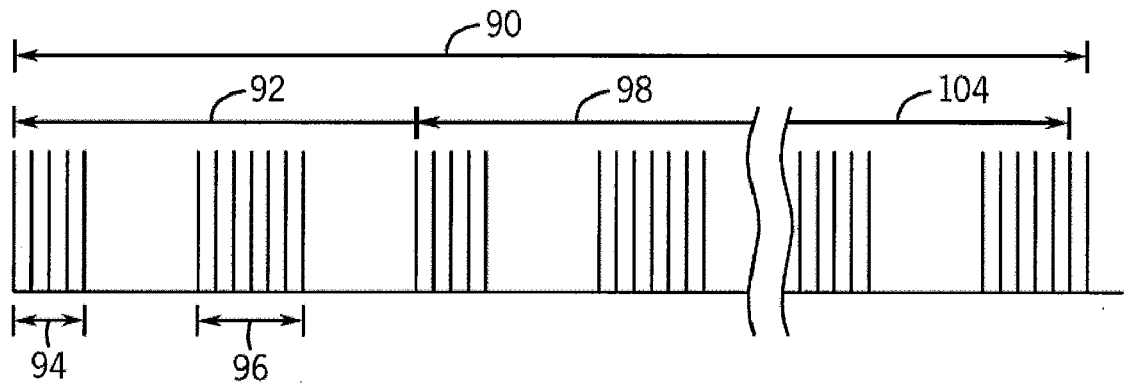
FIG. 4 is a diagram depicting a transmission cycle of the control system of the present invention.

Now turning to FIG. 4, a single transmission cycle 90 between the master 46 and the control units comprises a first communication 92 between the master and a first servant control unit 50. First communication 92 comprises a first master-servant message 94 and a first servant-master response 96. Overall, first communication 92 preferably takes about 100 microseconds. Each of messages 94 and 96 further includes a time out after 1 ms after which the sender of the initial transmission is required to resend the communication if a response thereto is not received. Preferably, the first master-servant message 94 comprises 8 bytes of data whereas the servant-master response comprises a 12 byte communication. The transmission cycle 90 is complete upon the communication of the master 46 with each of the units 50 on the dedicated network 48. As shown in FIG. 4, the transmission cycle further includes a second communication 98, a third communication (not shown), a fourth communication (not shown) and a fifth communication 104, wherein each of the communications is structured similarly to the first communication 92 having a master-servant message and servant-master response.

It should be understood that each of the various communications from the master 46 to the servant control units 50 of transmission cycle 90 are actually communicated to all of the control units, however, each transmission from the master 46 is coded such that only the intended receiver of the communication responds.

Figure 5:
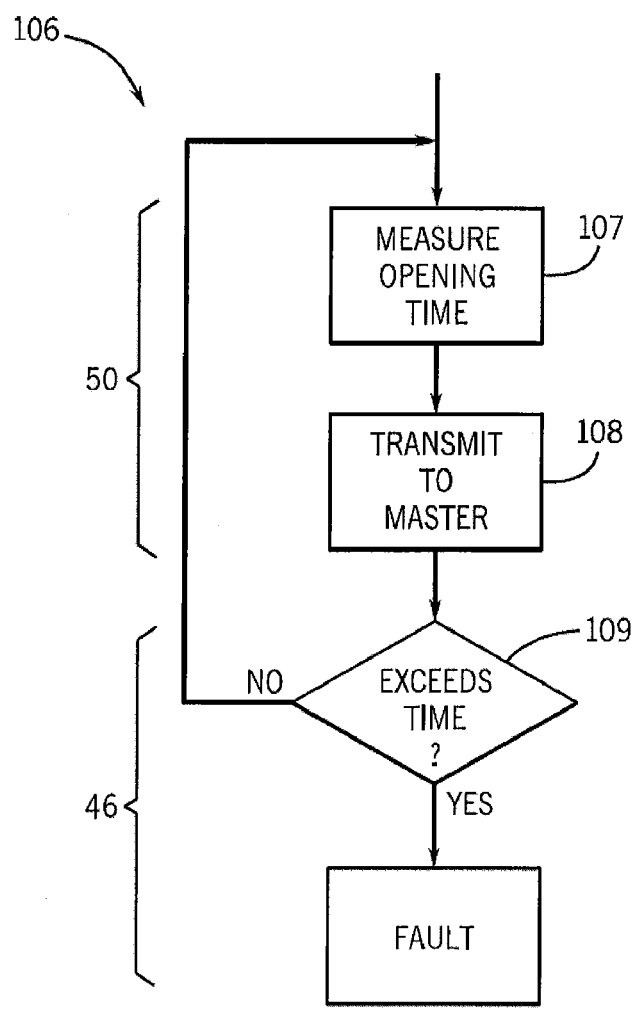
FIG. 5 is a flow chart showing the contact closure failure detection process of the control system of the present invention.

Turning now to FIG. 5, a method for detecting contact closure failure in a vacuum contactor 106 including a measuring step 107 wherein the servant control units 50 measure the actual time required for the contactor to close. Next, a transmission step 108 includes the transmission of the measured time value as an unscheduled transmission to the master control unit 46. If the time measured during the measuring step 107 exceeds a predetermined value, preferably about 150 ms, then the master control unit 46 indicates a fault during a decision step 109. If the predetermined value is not exceeded, the process 106 is exited.

Figure 6:
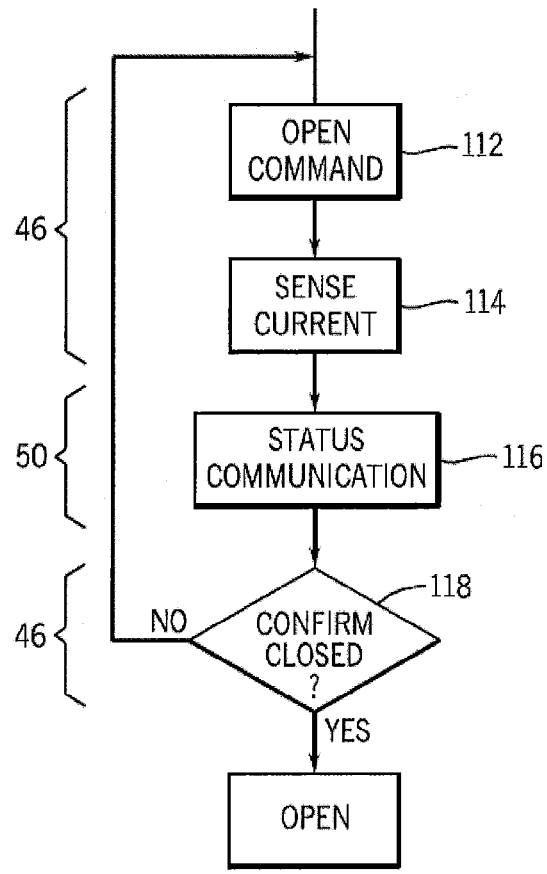
FIG. 6 is a flow chart illustrating the anti-kiss functionality of the control system of the present invention.

Now turning to FIG. 6, the control system 40 of the present invention includes an anti-kiss protection feature 110 that ensures that the main contacts of the vacuum contactors 12 are closed and sealed before they are allowed to open. The anti-kiss protection feature 110 is designed to ensure that once a contactor has been commanded to be closed, the contactor cannot be commanded to open until the closing process has been completed. Anti-kiss protection feature 110 includes a first step 112 a command to open the contacts of one of the vacuum contactors 12 is received by the master 46. Next, the servant control unit 50 associated with the vacuum contactor 12 senses the current status of the contact in a second step 114. Once servant control unit 50 obtains the status of the contact, a third step 116 includes servant control unit 50 sending the status to master unit 46. Finally, once the master unit 46 receives a message that the contacts are currently closed, the master 46 may issue a request to the servant control unit 50 associated with the contactor 12 to open the contacts as step four 118. If, however, the contacts are currently open, the master 46 does not issue a request to open the contacts, and the anti-kiss procedure 110 is performed again.

Figure 7:
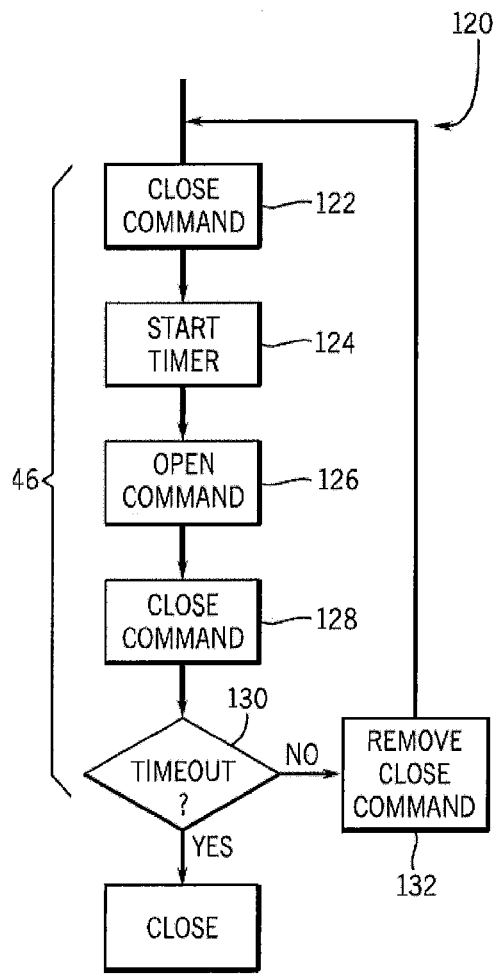
FIG. 7 is a flow chart depicting the anti-pumping functionality of the control system of the present invention.

Referring now to FIG. 7, the control system 40 of the present invention includes an anti-pumping protection feature 120 intended to prevent the contactor from rapidly opening and closing due to incorrect or faulty control circuitry, a faulty holding coil, faulty control electronics or the failure of the latch mechanism to properly engage. As such, the input control signal is required to open then close again before it is allowed to issue another close command. If the contactor receives a signal to close 122 a timer is started 124. Upon the issuance of an open command 126, if the system receives another close command 128 thereafter, the system determines whether a timeout value has been exceeded 130. If the timeout has been exceeded, then the contactor will close, however, if not, the close command is removed 132. Once the close command is removed, the contactor will not close again until another close command is issued.

It is specifically intended that the present invention not be limited to the embodiments and illustrations contained herein, but include modified forms of those embodiments including portions of the embodiments and combinations of elements of different embodiments as come within the scope of the following claims

We claim:

1. A vacuum contactor control system for controlling a plurality of vacuum contactors, comprising:
   a plurality of control units, wherein each control unit is associated with one of the vacuum contactors, and further comprises:
   a processor,
   a memory module storing processor executable instructions,
   at least one input terminal configured to receive a signal from a sensor monitoring operation of the associated vacuum contactor,
   at least one output terminal for providing a control signal to the associated vacuum contactor; and
   a first communication port configured to communicate with a dedicated network connecting the plurality of control units;
   wherein one of the control units operates as a master control unit and further comprises:
   a second communication port configured to communicate with a control network;
   wherein the instructions stored in the memory module on the master control unit are executable to coordinate control of the vacuum contactors by sending a command to the other control units and receiving the signals monitoring operation of the vacuum contactors from the other control units via the dedicated network.

2. The vacuum contactor control system of claim 1 wherein the master control unit is adapted to process the signals monitoring operation of each of the vacuum contactors, the signals communicated over the dedicated network, and to communicate a result of the processing on the control network.

3. The vacuum contactor control system of claim 1 wherein the master control unit provides anti-kiss functionality, wherein the master control unit ensures that contacts of the vacuum contactors are closed and sealed before the contacts may be opened.

4. The vacuum contactor control system of claim 1 wherein the master control unit provides anti-pumping functionality, wherein the anti-pumping functionality is provided to prevent contacts of the vacuum contactors from rapidly opening and closing.

5. The vacuum contactor control system of claim 1 wherein the master control unit is configured to predict the failure of contacts of the vacuum contactors based on the signals received from the other control units.

6. The vacuum contactor control system of claim 1 wherein a communication protocol for the dedicated network has a fixed time slot for communicating between the master control unit and each of the other control units.

7. The vacuum contactor control system of claim 6 wherein the communication protocol includes scheduled and unscheduled messages.

8. The vacuum contactor control system of claim 7 wherein the communication protocol communicates at least one of: the line voltage, coil current, CRC and warnings.

9. The vacuum contactor control system of claim 1 wherein the dedicated network communicates at a faster baudrate than the control network.

10. The vacuum contactor control system of claim 1 wherein the master control unit is in communication with a programmable logic controller (PLC), wherein the PLC is configured to communicate between the master control unit and devices on the control network.

11. The vacuum contactor control system of claim 1 wherein the dedicated network comprises a plurality of RS-485 serial connections.

12. The vacuum contactor control system of claim 1 wherein communication on the dedicated network is performed at a periodic predetermined rate.

13. A method of controlling a plurality of vacuum contactors comprising the steps of:

providing a control unit for each vacuum contactor, wherein the control units are operably coupled to the vacuum contactors;

networking the control units to one another, wherein the networked control units are configured to communicate with one another;

configuring one of the control units as a master, wherein the master is configured to monitor the other control units;

synchronizing the control units with one another;

sending commands from the master control unit to the other control units; and receiving responses to the sent commands from the control units at the master control unit.

14. The method of claim 13 further comprising a sensing step wherein the other control units are configured to sense a plurality of operating data from the vacuum contactors.

15. The method of claim 14 further comprising a communicating step wherein the master control unit communicates predetermined data to an industrial control system.

\* \* \* \* \*